United States Patent [19]

Garza, Jr.

[11] Patent Number: 5,480,353
[45] Date of Patent: Jan. 2, 1996

[54] SHAKER CRANK FOR A HARVESTER

[76] Inventor: Ponciano Garza, Jr., 3289 McCoy Rd., Colusa, Calif. 95932

[21] Appl. No.: 382,594

[22] Filed: Feb. 2, 1995

[51] Int. Cl.$^6$ .................................................. A01F 11/00
[52] U.S. Cl. ........................... 460/148; 460/133; 171/27; 56/327.1
[58] Field of Search ..................................... 460/148, 133, 460/142, 145, 146, 147; 56/327.1; 171/27, 40; 209/308, 365.1, 365.2

[56] References Cited

U.S. PATENT DOCUMENTS

| 3,666,017 | 5/1972 | Gates | 171/27 |
| 3,810,512 | 5/1974 | Porter | 171/27 X |
| 4,570,426 | 2/1986 | Bettencourt et al. | 56/327.1 |

FOREIGN PATENT DOCUMENTS 1192690  11/1985  U.S.S.R. .

OTHER PUBLICATIONS

FMC 1990 Tomato Harvester (manual) entire manual and particular p. 2, FIG. 2.

*Primary Examiner*—Terry Lee Melius

[57] ABSTRACT

A rotary powered crankshaft affixed transversely underneath a plurality of endless spaced apart conveyor belts on a tomato harvester. The crankshaft having a plurality of offset journals covered with rotatable bearing sleeves equal in number to the belts is positioned to have each journal bearing sleeve strike a belt when the journal reaches a raised position. The striking of the belts causes shaking of tomato vines riding atop of the conveyor belting to dislodge tomatoes which then fall through the spacings between the belts. The bearing sleeves covering each journal are freely rotatable, being sized with an internal diameter larger than the external diameter of the journal to allow both eccentric movement and rotation about the journal. The bearing sleeves are split lengthwise and include snap locks to allow initial installation thereof, and replacement when worn. The bearing sleeves are structured relative to the crank journals to be resistant to jamming so that the sleeves remain freely rotatable during operation, and thereby when a sleeve impacts the underside of a belt, the sleeve rolls as opposed to sliding. Preferably variable speed controls are applied to the motor utilized to rotate the crankshaft to allow the sleeved journals to move against the belting at either a slower or faster rate of travel compared to the belting, and thereby allow adjustability in the vibrational pattern applied to the tomato vines.

3 Claims, 7 Drawing Sheets

SHAKER CRANK FOR A HARVESTER

BACKGROUND OF THE INVENTION

1. Field of the Invention

This invention relates to equipment useful for removal of tomatoes from tomato vines during harvesting with a commercial harvester vehicle. The invention is directed toward a crank with bearing sleeves used in conjunction with a plurality of spaced apart conveyor belts which are used to shake tomatoes from the vines.

2. Description of the Related Prior Art

Modern commercial tomato harvesters, particularly ripe tomato harvesters, are capable of moving through a tomato field either being drivable self-propelled vehicles or tractor towed vehicles, and mechanically harvesting the tomatoes by severing the vines near the ground and conveying the vines with attached tomatoes upward via a lift conveyor to a separating mechanism which removes the tomatoes from the vines. The separating mechanism widely used today is a rotary drum, with the drum having outward extending flexible tines or rakes which vibrate and knock the tomatoes from the vines as the vines are passed into and through the rotating tines. The lift conveyor deposits the tomato carrying vines onto a plurality of narrow endless rotary belts which are parallel to one another and have openings between the belts, and the tomato removal drum with tines is positioned above and at the forward end of these spaced apart belts. The tomatoes fall downward through narrow openings between the conveyor beltings carrying the vines and then onto lower generally solid conveyer belts which convey the tomatoes to containers usually located on second vehicles driven adjacent the harvester. The stripped vines are conveyed to the rear or side of the harvester and deposited back onto the ground. The plurality of narrow endless rotary belts are the conveyor system for carrying the vines through the rotary stripping drum and toward the edge of the harvester for deposit back onto the ground after the tomatoes have been removed. The narrow belt loops are in spaced relationship and parallel to one another so that the vines are carried atop the moving belts, and any remaining tomatoes which do dislodge during conveying toward the rear of the harvester fall through the spaces between the parallel rotating belts to be collected on a wide flat conveyor belt. The narrow spaced apart belts typically extend from near the front beneath the rotary stripping drum toward the rear of the harvester.

With all prior art tomato harvesters of which I am aware, a small percentage of the tomatoes still remain on the vines when the vines are deposited back on the ground. The small number of the tomatoes remaining on the vines simply go to waste, and although the percentage may only be one-half of one percent up to five percent wasted, in large scale harvesting, this quickly adds up and can equate to a significant amount of dollars worth of tomatoes.

Although several prior art harvesters provide crankshaft-like or crankshaft activated devices for vibration of belts, rods or plates, for the purpose of dislodging tomatoes from the vines during harvesting, none of the related prior art disclosures teach the structuring of my invention, and none appear to mention or solve many of the problems I encountered during the development of my invention.

One relevant prior art harvester is shown in U.S. Pat. No. 4,570,426, entitled Tomato Harvester With Improved Separation Of Tomatoes From Other Picked Up Material, which was issued to Bettencourt et al on Feb. 18, 1986. Bettencourt et al shows a series of pivotally mounted walking bars which are agitated by an elongated crankshaft. The Bettencourt patent, U.S. Pat. No. 4,570,426, is herein incorporated by reference for both essential and nonessential material for the general structure of a tomato harvester which is moved through a field, having a harvesting sub-assembly which severs the plants and directs the plants with fruit up a conveyor to a shaker assembly. The shaker assembly agitates the vines and dislodges the fruit, which is then directed towards a collecting bin. The vines are then redeposited onto the ground.

Another relevant prior art harvester, entitled Separator For Tomato Harvester And The Like, is shown in U.S. Pat. No. 3,666,017 and was issued to Gates et al on May 30, 1972. The Gates et al patent discloses a tomato harvester having a series of parallel rotatable narrow endless belts trained over pulleys connected to rotary powered shafts transverse to the belts and which drive the belts. The parallel belts are positioned with narrow spacings to allow dislodged tomatoes to fall through in the process of separating the tomatoes from the vines. Shaking or vibrational mechanics are applied to the Gates et al belts to dislodge the tomatoes. Primarily for the features of the plurality of closely adjacent endless separator/conveyor belts, the support shafts, pulleys, and powering belts, motors and other components for the driving of the separator belts on a tomato harvester, the Gates et al patent pertaining to a tomato harvester is herein incorporated by reference for both essential and nonessential material.

Another related prior art disclosure is Soviet Union patent 1192690 issued in 1985. This patent teaches a tomato harvester having synchronized crankshafts which actuate rake members which dislodge tomatoes from the vines.

Additional relevant prior art information pertaining to commercial tomato harvesters and structure, including shaker conveyors upon which tomato vines are carried and shaken to dislodge the fruit may be found in Farm Machinery Corporation's (FMC) service and repair manuals on Tomato Harvesters which are manufactured by FMC. FMC manufactures various models of commercial tomato harvester vehicles, with the FMC tomato harvester models 5600T and 5600TE being particularly well suited for adaption with the present invention. FMC models 5600T and 5600TE are described in detail in the 1990 FMC service manual on "Tomato Harvester". Service manuals on FMC tomato harvesters may be obtained from: FMC Corporation, Food Processing Machinery Division, Box A, Madera, Calif. 93639. The FMC service manual dated 1990 and titled "Tomato Harvester" describing harvester models 5600T and 5600TE is herein incorporated by reference for nonessential information primarily for the detailing therein of self-powered driveable tomato harvest vehicles which include rotary drums with tines as the primary tomato remover, and which further include narrow and parallel conveyor belts with spacing therebetween upon which tomato vines are carried. FMC tomato harvester models 5600T and 5600TE also include hydraulic pumping stations for powering various hydraulic motors and rams to operate powered components of the harvester.

During the development and testing of my herein disclosed invention which uses a rotating crank or crankshaft placed against spaced apart narrow rotary conveyor belts to shake the belts and to thus remove most or all of the remaining tomatoes behind the primary removal stage, I first encountered many problems which I believe I have inventively solved, and which are not believed to have been addressed by the related prior art. One problem I encountered was the speed at which the conveyor belts could be rotated relative to the rotational speed of the crankshaft while having durability in the related components. The speed and overall efficiency at which harvesting may be accomplished in commercial farming is clearly important. Another problem I encountered was with the vines winding around the crankshaft, which would require harvesting to be stopped until the vines were cleared away. Still another problem I encountered was in achieving a proper and adequate shaking or vibrational pattern which would remove tomatoes as desired, and in a structural arrangement which was highly durable, as I found that different varieties of tomatoes at different degrees of ripeness react differently dependant upon varying vibrational rates which I accomplish through variable speed control and other structuring associated with my crankshaft utilized to shake the conveyor belting.

SUMMARY OF THE INVENTION

The present invention is primarily directed towards a crank or crankshaft with bearing sleeves used as a shaker mechanism against narrow and parallel spaced apart conveyor belts on tomato harvesters for separating the tomatoes from the vines in a secondary tomato removal process. As mentioned above, some existing tomato harvesters use a series of parallel continuous rotating conveyor belts to transport the vines from the front toward the rear of the harvester, and any remaining tomatoes on such open belts located mostly behind the primary tomato remover device which do dislodge fall through the openings between the belts to be captured. My invention utilizes a specific crankshaft arrangement which is for use on such harvesters having the endless open belt conveyors upon which the vines are carried, and may be installed at the factory while the harvester is being manufactured, or installed as an after market item to existing harvesters to improve harvesting efficiency. The invention may be applied to tomato harvesters of the type which are towed or which include engines and steering mechanics and are thus self-propelled.

The open conveyor belts, henceforth mainly referred to as shaker conveyor or shaker belts, are agitated by my rotating crankshaft which has a plurality of variably positioned crank journals which alternately raise and lower a portion of each belt in rapid succession. Typically the individual belt width and spacing between the belts is such that a given tomato vine when riding atop the belts will be laying or spanning multiple belts, and thus when the belts are agitated, the vines atop of the belts shake to the point of dislodging any remaining tomatoes. Since each crank journal is positioned offset relative to the adjacent journal much like that of the crankshaft of most multi-cylinder internal combustion engines, belts adjacent to one another are raised and lowered separately, which creates the shaking effect in the vine which would in essence being atop a rapidly changing uneven surface. This shaking effect can be increased or intensified by varying the rate of rotation of the crankshaft and the speed of rotation of the shaker belts. Speed controls for the crankshaft and shaker belts are preferably separate controls to allow independent speed control thereof, and with which in combination with specific journal bearing sleeves to be detailed, the present invention allows for the ready varying of the vibration pattern, and this allows for settings at an optimal level for particular harvesting conditions, ripeness and varieties of tomatoes.

The present invention uses rotatable bearing sleeves over each journal of the crankshaft which contact the belts. The bearing sleeves are made of durable material such as plastics, are structured to be replaceable, and are sized and structured so as to help prevent the winding of vines around the sleeves and crankshaft. The bearing sleeves which freely rotate about the crank journals are additionally structured relative to the structuring of the crankshaft to be highly resistant to being rendered non-rotatable by debris such as dirt, rocks and leaves, so that the sleeves remain rotatable about the crankshaft journals during operation. It is very important that the bearing sleeves remain rotatable about the crank journals so that when the crankshaft rotates and brings the bearing sleeve upward into contact with the bottom side of a belt, the bearing sleeve rotates on the journal and belt as opposed to skidding or sliding with a high degree of friction against the belt. I found that if the bearing sleeves skidded or slid in high frictional contact against the underside of the belts, that the sleeves and belts would quickly wear and soon need costly replacing. The bearing sleeve and crankshaft arrangement of the present invention wherein the sleeve or sleeves are predictably rotatable about the crank journal provides for little or no winding of vines around the crankshaft and sleeves; provides for high durability in the belts and sleeves, and allows for the use of separate variable speed controls on the belt conveyor and the crankshaft. The free spinning sleeves on my crankshaft allow the crankshaft to be rotated at any desired speed, slower or faster than the speed of movement of the belts without having the high level of destructive friction against the sleeves and belts, and this allows for operating the crankshaft at optimal rotational speed for achieving the best vibrational pattern for dislodging the tomatoes under the particular harvesting conditions, variety and ripeness of tomatoes being harvested. In most situations the rate of travel of a sleeve covered crank journal against a bottom portion of a belt is much higher than the rate of travel of the belt, but due to the sleeve which contacts the belt being free to spin, the sleeve simply spins or rolls against the belt and does not in effect slide, as sliding causes rapid wear of the sleeve and belt.

In addition to each bearing sleeve being freely rotatable about the crank journal, in order to even further reduce the incidence of vines wrapping around the crankshaft, sleeves and journals, the interior diameter of the hollow bearing sleeves is substantially larger than the exterior of the crank journals about which the sleeves rotate. This substantial size difference allows for the bearing sleeves to not only spin or rotate about the journals, but also to move eccentrically or to orbit or wobble about the crank journals. The capability of the sleeves to move eccentrically has been found to greatly reduce the number or amount of tomato vines which will wrap around the crankshaft or sleeves, and this is believed to be because at the point at which a vine begins to wrap about the sleeve or sleeves, the journal under the pressure of the vine begins to slap or bang against the interior of the sleeve, and this banging causes an added vibration or shaking which has been found to throw the vine off of the sleeve, and to be highly effective at preventing the vines from wrapping about the crankshaft and sleeve. This eccentric movement or wobbling of the sleeves when coupled with the sleeves being capable of rotating or spinning about the journals has been found to be highly effective at preventing vines from winding about the crankshaft.

Even though the crank journal sleeves are rotatable and last a very long time, they will still eventually wear and need replacement after many hours of harvesting. Therefore, the tubular sleeves are split sleeves, being split lengthwise centrally, and include a tongue and groove snap lock at the seaming for connecting the two portions. The tongue and groove locking components when connected are very secure so as to not disengage during use, and to provide a smooth cylindrical outer and inner bearing surface, however, the locking components may be intentionally disengaged for removal of a worn sleeve and replacement thereof.

My invention will be better understood and appreciated with continued reading and a review of the attached drawings.

BEST MODE FOR CARRYING OUT THE INVENTION

Figure 1:
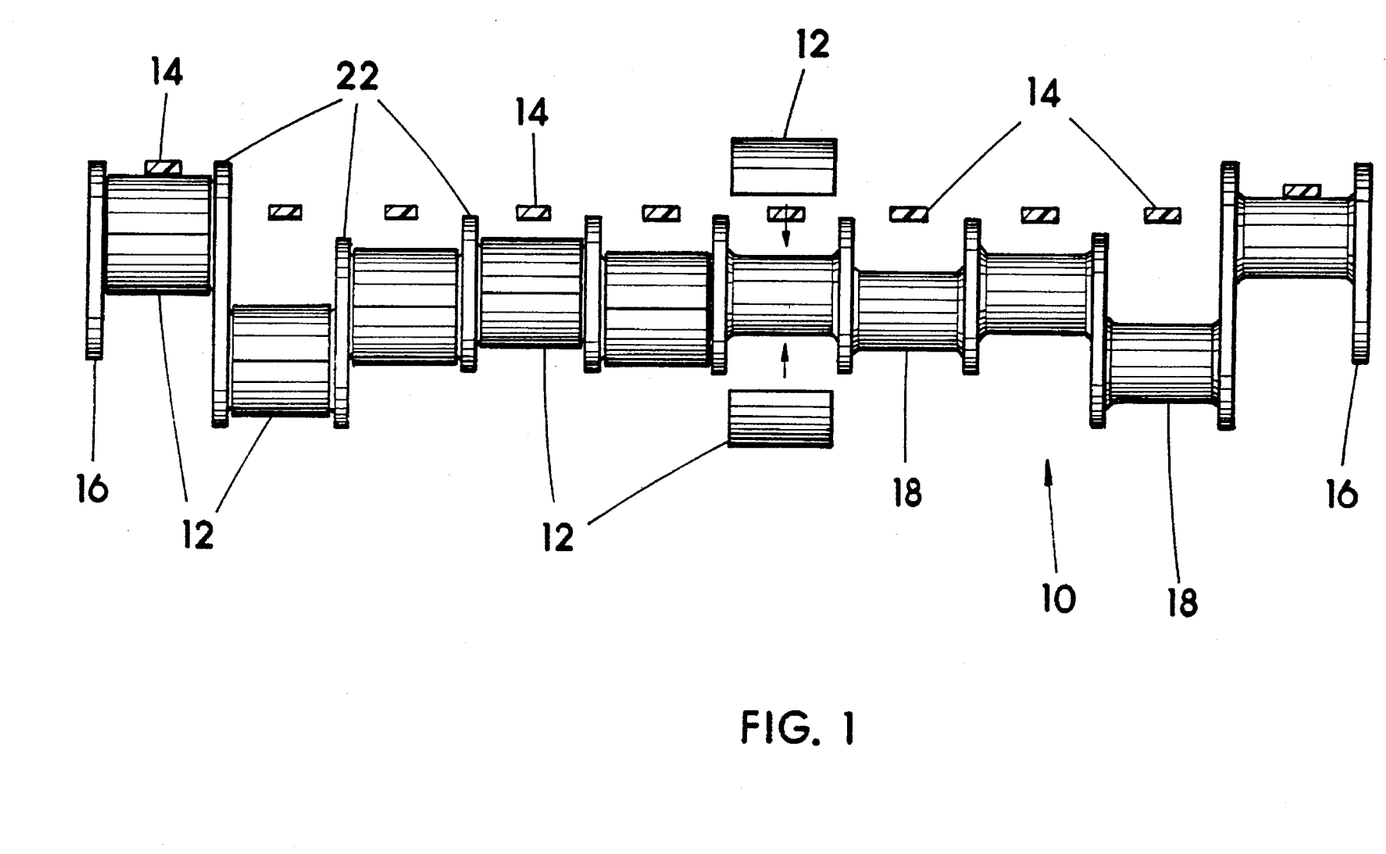
FIG. 1 is a side view of my crankshaft showing several crank journals to the left affixed with the bearing sleeves; the central journal is shown in the process of being affixed with a bearing sleeve, and the remaining journals on the right do not have bearing sleeves yet applied. The top portion of endless shaker belt loops are shown passing perpendicularly above the crank journals.
Figure 5:
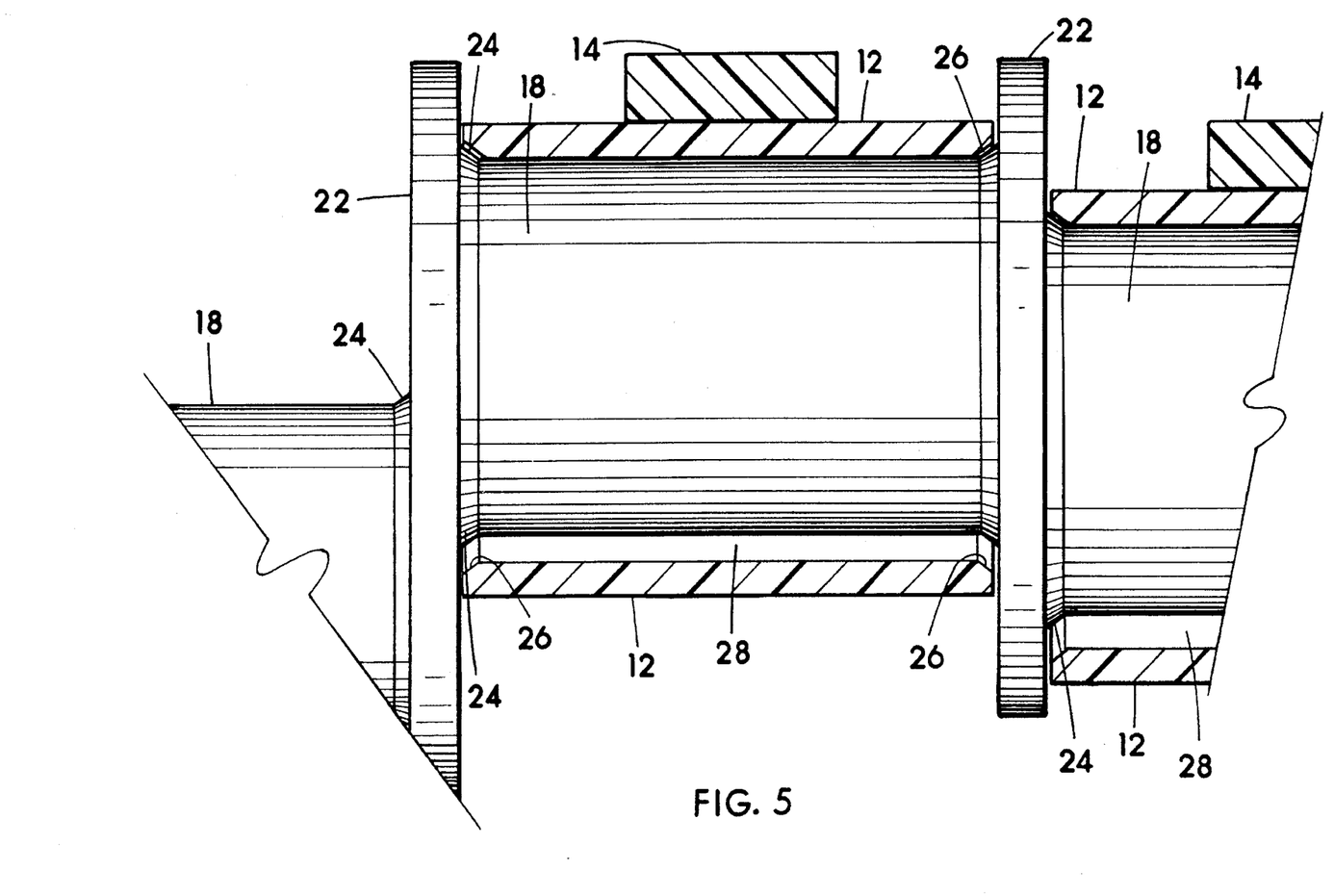
FIG. 5 is a side view of a section of the crankshaft showing bearing sleeves, in cross section, affixed over crank journals. In this view it can be seen that the internal diameter of the bearing sleeves are substantially larger than the external diameter of the crank journal over which the sleeves are applied. The partial illustration of the crank journal on the far left is shown without a bearing sleeve. Conveyor belts are shown atop the bearing sleeves.

Referring now to the drawings wherein an example of my invention for use in conjunction a tomato harvester 11 is illustrated. Crankshaft 10, bearing sleeves 12 and the top portion of endless loop shaker belts 14 are illustrated in FIG. 1. Crankshaft 10 is constructed similar to most multi-cylinder internal combustion engine crankshafts, being elongated, having two oppositely disposed terminal ends with connecting journal end plates 16 useful for mounting the crankshaft on a harvester 11, and having a plurality of offset crank journals 18 along the length thereof. Crankshaft 10 is mounted transversely to the belts 14 so that the journals 18 with sleeves 12 may interact with the belts 14. The crank journals 18 as may be seen in FIGS. 1 and 5 are offset from one another and outward from the center rotational axis of crankshaft 10 wherein a first crank journal 18 might be positioned vertically straight up, with the adjacent journal positioned around and slightly downward, and the next journal adjacent thereto positioned further around and downward from the first and second journals. When crankshaft 10 rotates, each crank journal 18 rotates in a relatively large circle, orbiting about the rotational axis of crankshaft 10. The orbital circle can be about twelve inches in diameter, although I do not wish to be restricted to this dimension given for example. With rotation of crankshaft 10, the orbital circle and offsetting or staggered placement of the journals 18 allows for the journals 18 with bearing sleeves 12 to raise to the point of contacting the underside of the shaker belts 14, and with continued raising to lift the belts 14 three to six inches (example only) beyond where the belts 14 normally rest, followed by continued rotation of the crankshaft 10 disengaging from the underside of the belts 14 at which point the belt or belts 14 drop to their normal resting elevation. The twelve inch circle is given for example, as clearly the crankshaft 10 can be sized differently from this, and can be mounted higher or lower toward the normal resting position of the belts 14 to effect the degree of rise in the belts 14. The rotation of crankshaft 10 provides for adjacent shaker belts 14 to be rapidly pushed to differing elevations relative to one another due to the staggered offsetting of the adjacent crank journals 18, with this in effect providing a constantly and rapidly changing uneven surface upon which the tomato vines ride, and thus the vines 20 are shaken to free tomatoes 74. Shaker belts 14 are of a width and in close proximity to one another so as to provide a sufficiently wide surface to support tomato vines resting on top of the belts 14. Typically a tomato plant will span 3 to 5 belts 14 dependant upon the size of the plant, and most harvesters having such spaced conveyor belts (shaker belts 14 in this example) typically have either 8 or 10 belts in parallel rows. Shaker belts 14 must of course be flexible and not stretched so tightly as to prohibit the raising thereof by the crankshaft 10, and typically shaker belts 14 are generally non-stretchable fabric-filled rubbery material as opposed to being metal chains.

Crankshaft 10 is made of a strong rigid material such as steel or possibly cast iron. I prefer to fabricate crankshaft 10 from welded steel tubing and steel plate stock. Crankshaft 10 is generally comprised of connecting journal end plates 16 located one on each terminal end of the crankshaft, journal end plates 22 inward of plates 16, with one journal end plate 22 welded or otherwise affixed such as by integral casting to each oppositely disposed end of a crank journal 18. Each journal 18 is a smooth surfaced elongated cylinder of about 3 inches in external diameter, although this dimension is for example only and could be altered, for it should be appreciated that the external diameter of the journals 18 must be substantially smaller than the internal diameter of bearing sleeve 12. Journals 18 are affixed lengthwise parallel with the lengthwise center rotational axis of crankshaft 10, and between two journal end plates 22, or as in the case of the two oppositely disposed outermost journals 18 at each terminal end of the crankshaft, affixed between a journal end plate 22 and a connecting journal end plate 16. Crank journals 18 may be hollow tubing for weight considerations, or solid. The journal end plates 22 or connecting end plates 16 are elongated rigid plates, preferably of steel, and are affixed extending outward lengthwise perpendicular relative to the lengthwise center rotational axis of crankshaft 10. The journal end plates 22 and 16 are relatively wide flat plates having two wide flat oppositely disposed surfaces to which the ends of the cylindrical crank journals 18 are welded as may be seen in the drawings. Plates 22 and 16 extend outward parallel to one another. The crank journals 18 extend perpendicularly from the wide flat surfaces of the end plates 22 or 16. Each end of each crank journal 18 is affixed to a journal end plate 22, with the outermost ends of the two oppositely disposed outermost crank journals 18 affixed with the connecting journal plates 16 which are in effect journal end plates but which are additionally structured with bolt holes 30 to be attachable to rotatable support plates 40 to rotationally mount crankshaft 10 as will be detailed. Journals 18 are affixed to plates 22 and or 16 toward one end of the plate, but sufficient plate material is left surrounding the journals 18 so that when the tubular sleeves 12 are applied about the journals, the otherwise open ends of the sleeves 12 are in effect closed, being in close proximity to the end plates 22 and or 16 which are serving as end walls closing the bearing sleeve, and this to prevent the entrance of debris into between the journals 18 and sleeves 12. The end plates 22 and 16 both support the journals 18 and serve as walls adjacent each oppositely disposed terminal end of the bearing sleeves 12 to maintain the sleeves 12 laterally over the journals and to prevent dirt from entering into the hollow interior of sleeves 12. The spacing between the journal end plates, or the length of journals 18 is about 60 thousandths of an inch longer the bearing sleeve 12, and although this is a relatively close fit, the bearing sleeve will be allowed to freely rotate, but with such a close fit, dirt and debris will be largely excluded from entering between journal 18 and sleeve 12. The journal 18 being about 60 thousandths of an inch longer the bearing sleeve 12 is given for example only, and I do not wish to be strictly limited thereto, as it must be realized that the point being made is to size the sleeves 12 to be able to freely rotate about the journals 18 while excluding as much dirt, leaves, rock and the like from entering between the journal and bearing sleeve, and this to reduce internal wear and to provide for continued eccentric movement of the sleeves 12 on the journals 18. As shown in FIG. 5, the welding of the end plates 22 and 16 to the journals 18 normally leaves a weld bead 24 at the exterior corner at the meeting of the two members, and sleeves 12 preferably include a bevel 26 at the interior annular edge at both ends thereof to provide space for weld bead 24.

There are an equal number of sleeve 12 covered journals 18 on crankshaft 10 as there are endless belts 14 of the shaker conveyor, and normally this is either eight or ten on conventional harvesters. Crankshaft 10 is rotatably mounted to the tomato harvester 11 beneath the upper portion of shaker conveyor belts 14, and transversely thereto so that the belts 14 are positioned perpendicularly to each journal 18, with one journal 18 positioned under each belt 14. The belts 14 are endless belts of flexible material, and are positioned to define a large loop as may be seen in FIG. 6, and therefore since the tomato vines 20 ride atop the belts 14, crankshaft 10 is positioned just beneath the underside of the top portion of the belting loop, within the loop so that the sleeves 12 on the journals 18 may strike the underside of the belts 14 just beneath the vines 20 and shake the belting 14 close to the tomato vines 20.

Figure 2:
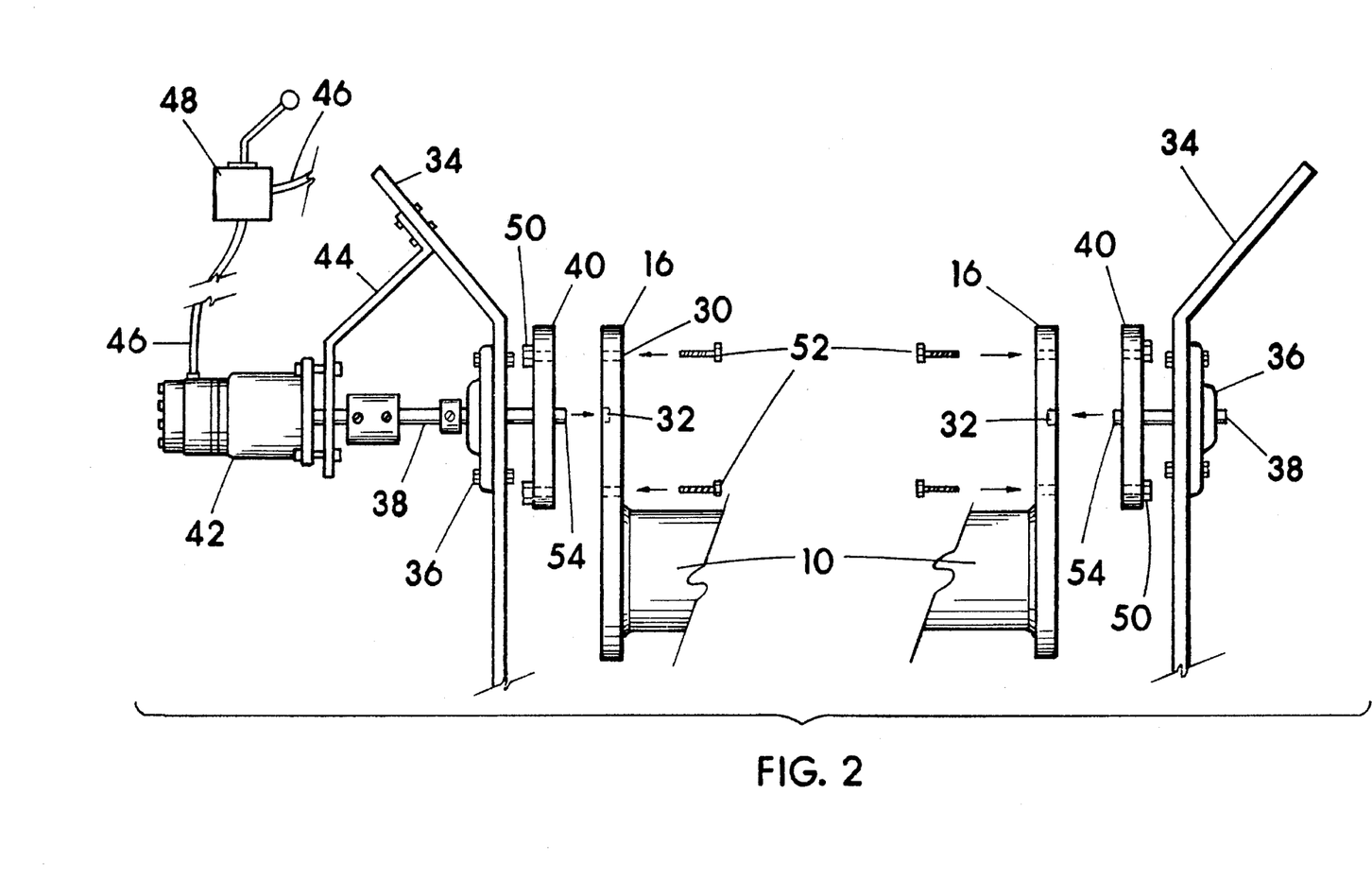
FIG. 2 is an exploded partial side view of my crankshaft with the center section removed for illustrative purposes, positioned between two side panels or walls of a portion of a harvester, showing the connections of outermost journal end plates to a rotatable attachment plate and a motor drive unit for axially rotating the crankshaft under power. The shaker belts are not shown in this illustration.

FIG. 2 is an exploded partial view of crankshaft 10 positioned between two side panels or walls 34 existing on harvester 11 at least in part beneath and to each side of the shaker belts 14, with mounting bearings 36 bolted to walls 34 of harvester 11 and supporting rotatable shafts 38 having mounting plates 40 affixed thereto to rotate with shafts 38.

Figure 3:
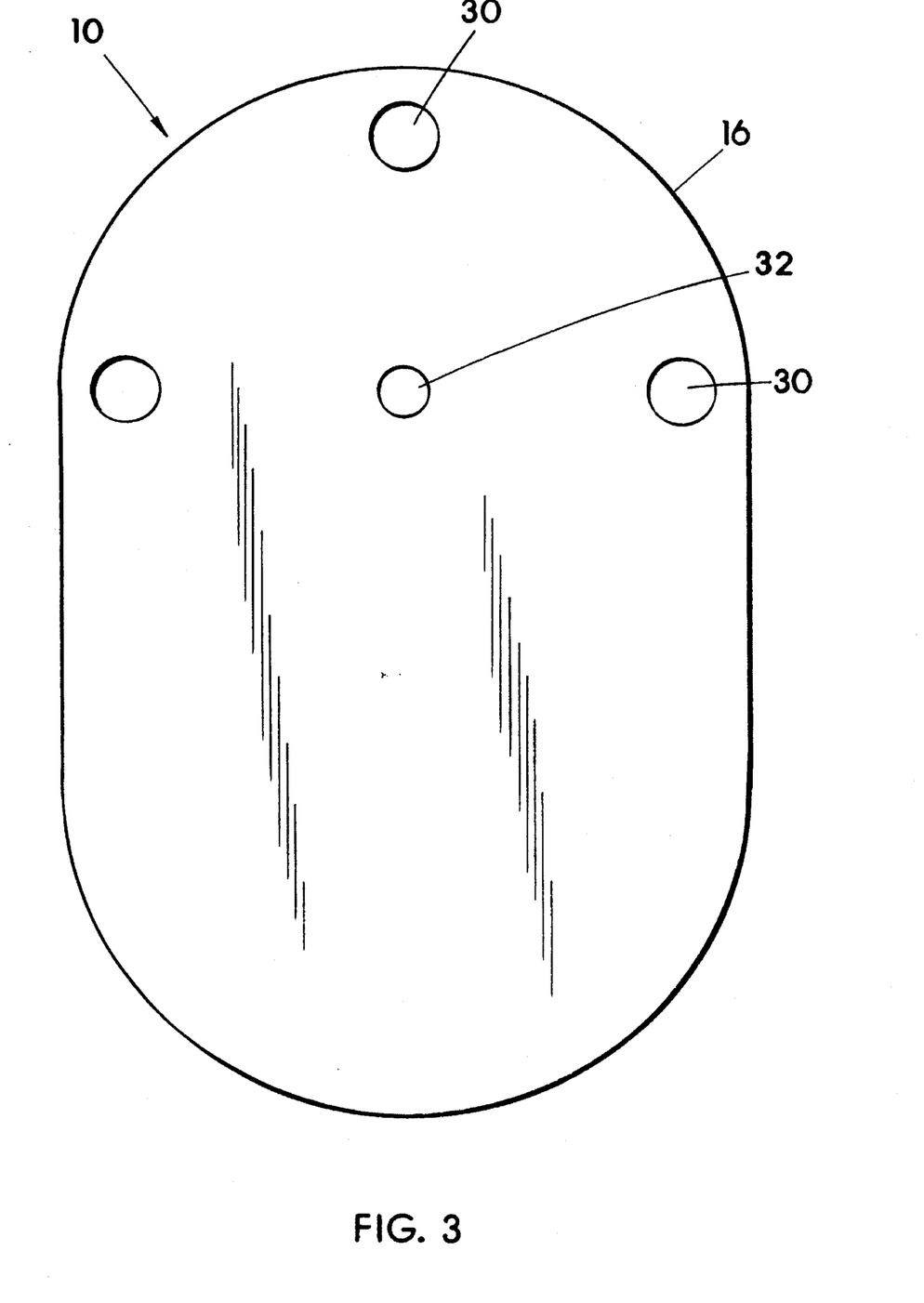
FIG. 3 is an end view of one of the outermost journal end plates of the crankshaft utilized in rotatably mounting the crankshaft as indicated in FIG. 2.

Plates 40 attach to the terminal end plates 16 of crankshaft 10 when fully assembled. The rotatable shaft 38 on the left is shown coupled to, so as to be rotatable by, motor 42 which is preferably hydraulically powered and of a variable speed. Motor 42 is shown connected to wall 34 with a bracket 44 which prevents the motor housing or body from spinning. The spinning of the shaft 38 by motor 42 rotates the mounting plate 40 which when crankshaft 10 is securely affixed thereto causes crankshaft 10 to rotate under power. Hydraulic feed lines 46 are shown connecting motor 42 to a control valve 48 which is capable of allowing widely varying speeds of rotation to be applied to crankshaft 10. The hydraulic fluid and pressure to operate motor 42 is from the harvester 11 hydraulic system, as most all large commercial harvesters include many hydraulically driven motors and actuators. It should be noted that other drive or powering systems to rotate crankshaft 10 can be used within the scope of the invention. FIG. 3 is an end view of one of the outermost journal end plates 16 of crankshaft 10 utilized in rotatably mounting the crankshaft 10 to mounting plates 40. End plates 16 include multiple smooth bores 30 for passage of bolts shanks 52. The threaded shanks of bolts 52 pass through smooth bore holes in mounting plates 40 and then threadably engage with nuts 50 welded over the holes in plates 40, although other fastening arrangement can be used. An alignment pin 54 extending from each plate 40 alignable and insertable into a receiving hole 32 in each plate 16 may be used to assist in aligning crankshaft 10 when attaching to mounting plates 40.

Figure 4:
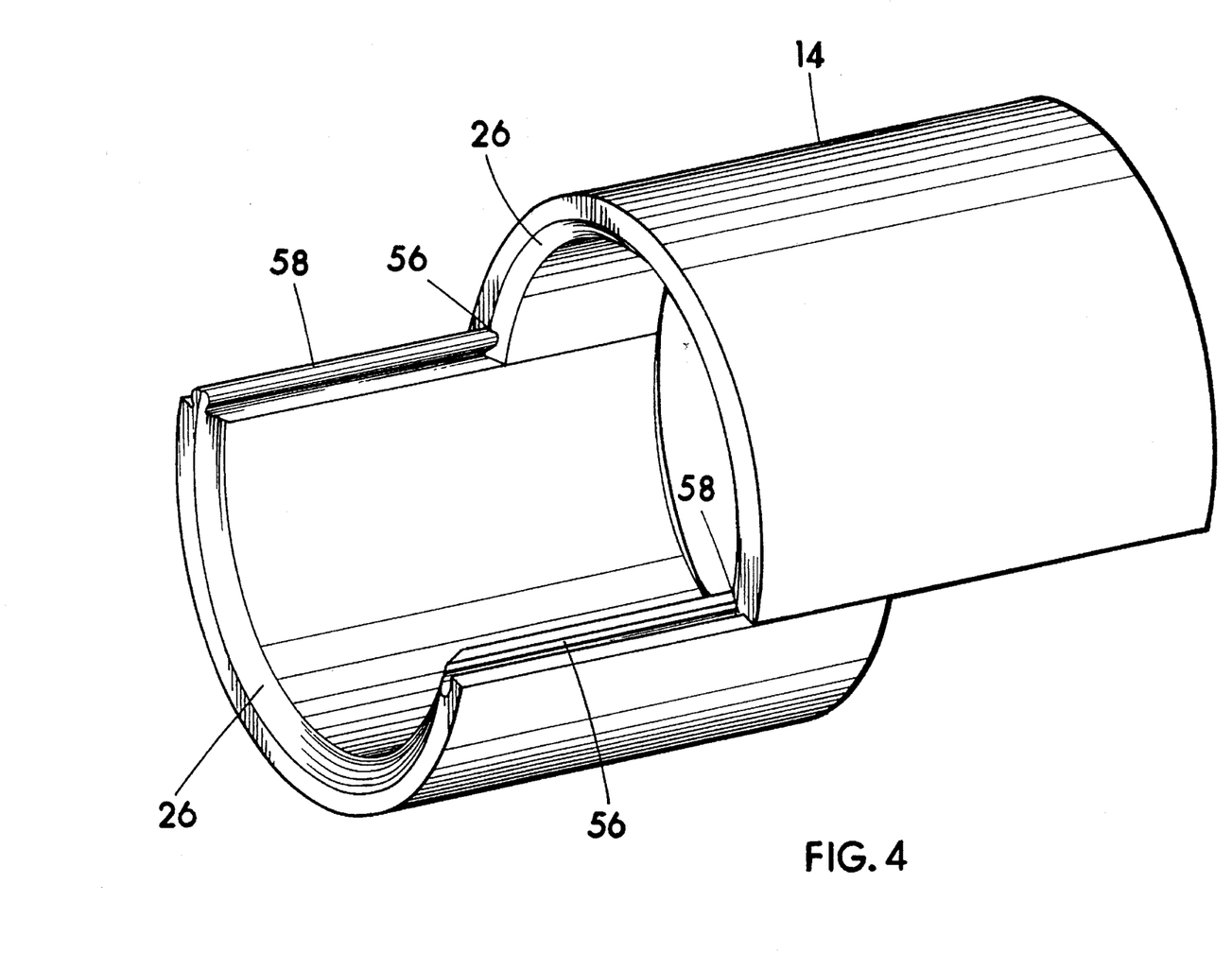
FIG. 4 is a perspective end view of a bearing sleeve in accordance with the present invention and partially separated to show the interlocking tongue and groove seams of the two piece bearing sleeve.

FIG. 4 is a perspective end view of a bearing sleeve 12 partially separated to show the interlocking tongue and groove snap lock seams of the two piece bearing sleeve 12. Each bearing sleeve 12 is made in two identical C-shaped or half-circle sections or halves preferably of a durable and slick plastics material, with each half having a tongue 58 along one lengthwise side edge, and a groove 56 along the oppositely disposed lengthwise side. The bearing sleeve halves are rotated end for end to align a groove 56 with a tongue 58 when the sleeve is connected to define a tubular bearing sleeve 12. The groove 56 is narrow along its lateral opening, and widens outward further down within the groove. The tongue 58 is wider at its lateral forward edge, and narrower closer to the main body of the sleeve section, and thus a tongue 58 can be forcefully pressed into a groove 56 to create a tight interlock. The pressing of tongue 58 into groove 56 should be one which requires significant pressure to "snap" the tongue and groove together, and once snapped together, which should be appreciated is about a journal 18, should be a durable connection which will not disconnect during operation. In order to press the two pieces of a bearing sleeve 12 together, which requires the snapping of two tongue and groove snap locks per sleeve, one on each oppositely disposed side of the sleeve, I use a clamping tool such a tightenable chain tongs or large pliers. The tongue and groove must be a tight or secure fit or the bearing sleeves 12 will fall apart under use. Since the sleeves 12 will periodically wear out and need replacing, I prefer not to use glue or adhesive at the locked seams of the sleeve 12 which would render it excessively difficult to remove from a journal 18, although glue or fasteners could also be used but are not believed necessary. In order to separate the two pieces of a bearing sleeve 12 affixed about a journal 18, a wide chisel or the like pry tool having a narrow starting edge can be inserted into the small crack between one of the tongue and groove interlocks to pry them apart. Bearing sleeve 12 when snapped together is tubular, having an annular smooth exterior surface and an annular smooth interior surface. The bearing sleeve or sleeves 12 include flat ends adjacent the interior edge bevel 26. The flat ends shown best in FIG. 4 rest in close adjacency to journal end plates 22 and or 16 so that a close fit for excluding debris is defined, as mentioned above. I make my sleeves 12 about four inches in length, as a belt 14 is normally about one to one and a half inches wide, and the length of the journals 18 relative to sleeves 12 has been previously detailed. As may be seen in FIG. 5, the interior diameter of the snapped together bearing sleeve 12 is substantially larger than the exterior diameter of journals 18. In FIG. 5 a space is shown at 28, and this space may be between ¼ and ¾ of an inch for example. although I do not wish to be strictly limited thereto since it could be slightly less and substantially greater within the scope of the invention. The point of the spacing 28, i.e., the internal open diameter of the sleeves 12 being substantially larger than the exterior diameter of journals 18 is to allow the bearing sleeves 12 to not only rotate or spin about the journals 18, but to also be able to move eccentrically. I have found that the ability of the sleeves 12 to move or wobble eccentrically on the journal greatly reduces the number or amount of tomato vines which will wrap around the crankshaft 10, and this is believed to be because at the point at which a vine begins to wrap about the sleeve 12, the journal begins to slap or bang against the interior of the sleeve, and this banging causes an added vibration or shaking which has been found to be highly effective at preventing the vines wrapping about the crankshaft.

Figure 6:
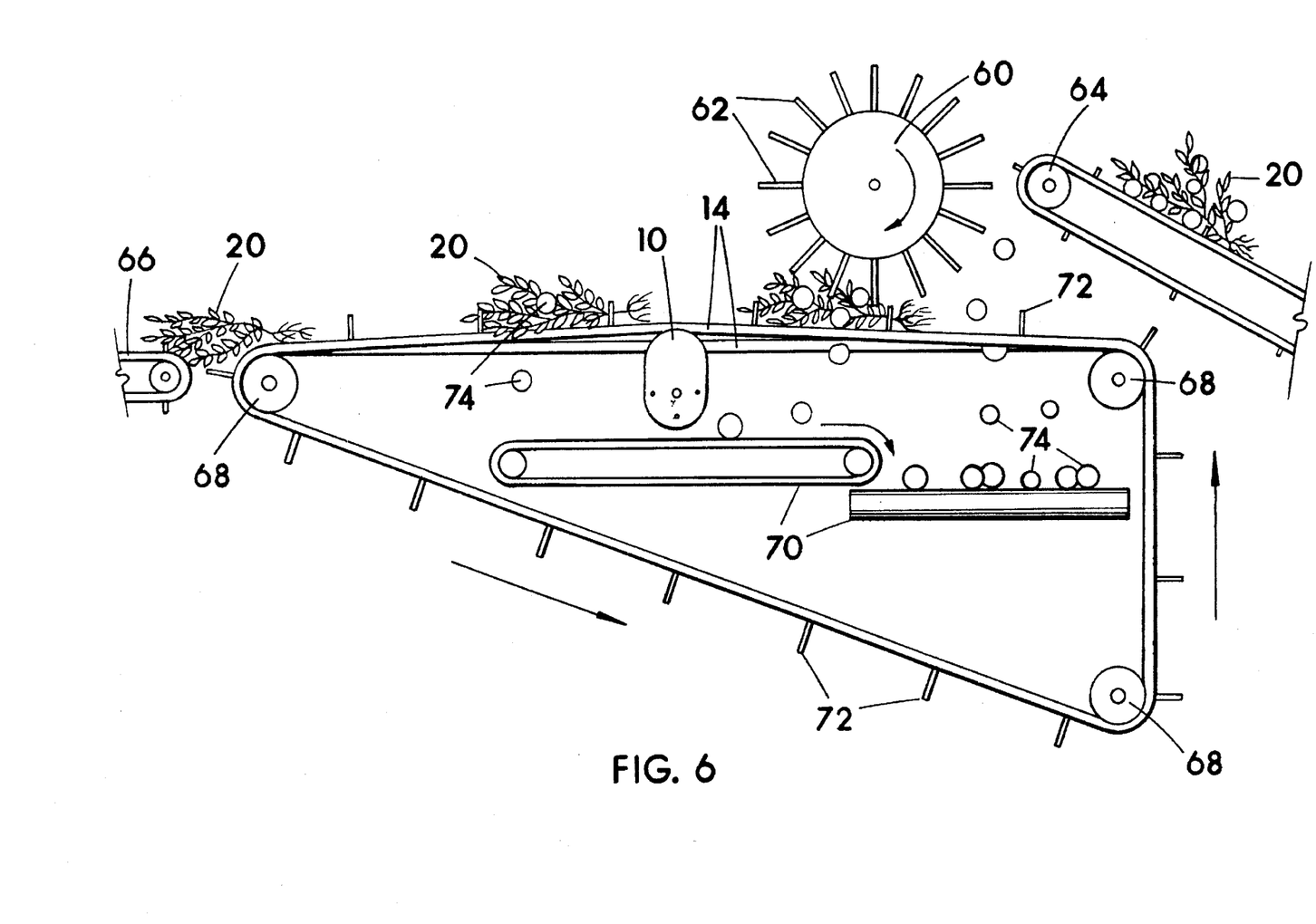
FIG. 6 is a basic illustration from a side view of an end of my crankshaft positioned against the upper portion of the endless loop shaker belts among additional solid-surface conveyor belts which are typically on tomato harvesters for catching and transporting the freed tomatoes to sorting or storage stations. Rubbery fingers or tines are shown extending from the shaker belts as is relatively common on such belts to help move the tomato vines.

FIG. 6 is a basic illustration from a side view of an end of my crankshaft 10 positioned against the upper portion of the endless loop shaker belts 14 among additional solid-surface conveyor belts 70 which are typically on tomato harvesters 11 for catching and transporting the freed tomatoes to sorting or storage stations. Also shown are the lift conveyor 64 which conveys the tomato vines with tomatoes 74 from the field upward for deposit onto belts 14. Belts 14 then convey the tomato plants into and through the primary tomato removal drum 60 with tines 62. As may be seen in the drawing, most tomatoes 74 are shaken from the vines by drum 60, however, the belts 14 extend rearward carrying the vines with the remaining tomatoes over crankshaft 10. Crankshaft 10 when rotating, preferably between 100 and 300 RPM, will shake belts 14 which will shake the remaining tomatoes 74 from the vines 20. Belts 14 typically transport the stripped vines 20 further rearward for deposit onto an off-load conveyor 66 which will transport the vines to the rear or sometimes side of the harvester 11 for deposit back onto the ground. The loop belts 14 are shown trained over three elongated rotatable pulleys or shafts 68, one of which is powered to cause the belts 14 to all rotate together. A speed control in common on belts 14. Fingers or tines 72 are shown extending from the shaker belts 14 as is relatively common on such belts to help move the tomato vines.

Figure 7:
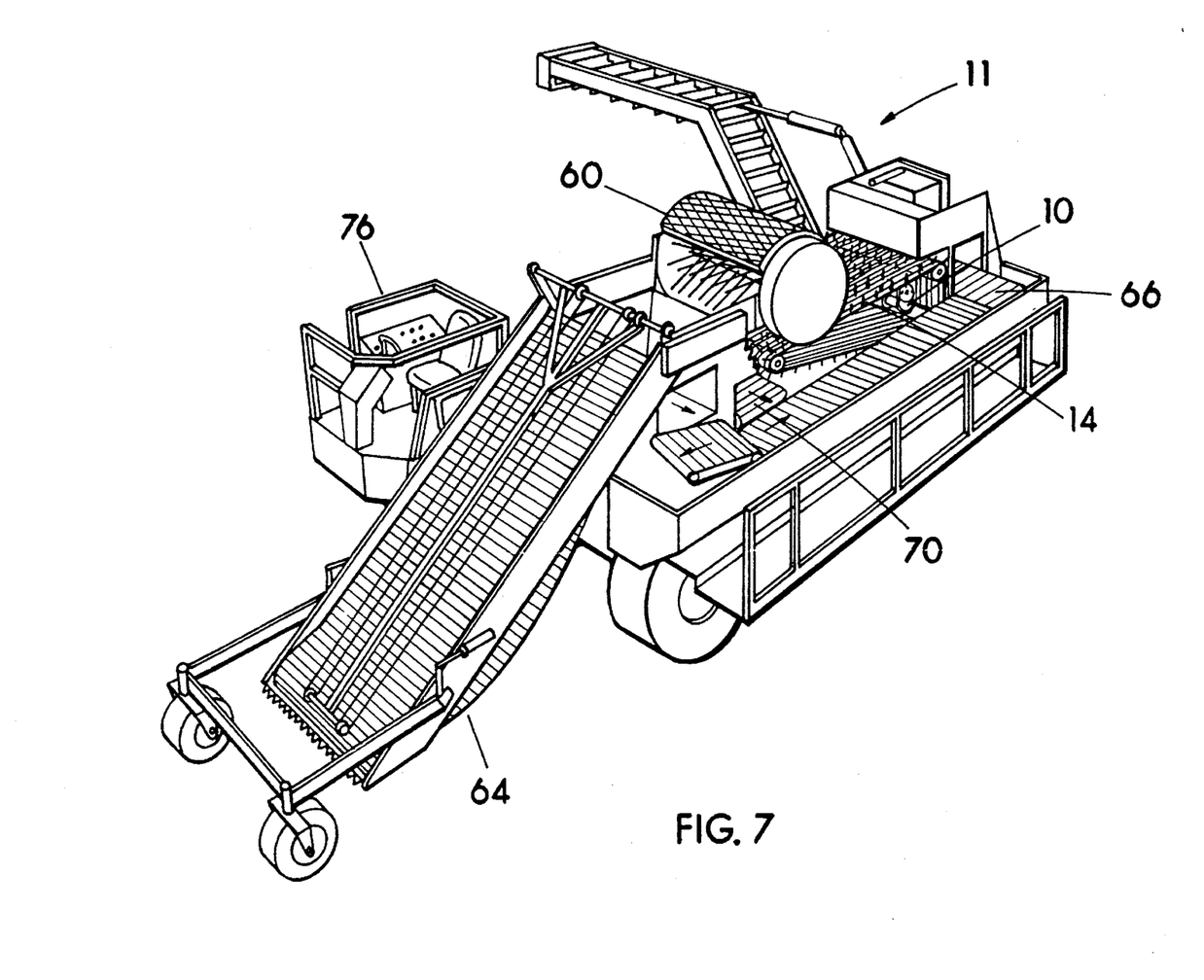
FIG. 7 is a top perspective view of a self-propelled tomato harvester equipped with shaker belts and a crankshaft in accordance with the present invention. The crankshaft is shown positioned underneath the top portion of the shaker belt loops, and the wall to which the crankshaft end is rotatably attached as shown in FIG. 2 has been removed from the drawing to allowing the showing of the crankshaft on the harvester.

FIG. 7 is a top perspective view of a self-propelled tomato harvester 11 with a driver or operator cab 76 equipped with shaker belts 14 and a crankshaft 10 in accordance with the present invention. The crankshaft 10 is shown positioned underneath the top portion of the shaker belt loops 14, and the wall to which the crankshaft end is rotatably attached as shown in FIG. 2 has been removed from the drawing to allowing the showing of the crankshaft on the harvester. Based on the rotating speed of crankshaft 10, normally the rotating sleeves 14 will be traveling against the underside of belts 14 at a higher rate of travel than the movement of the belts 14, and the spinning or rotating of the sleeves 12 against the belts prevents undue wear of both the sleeves and belts, and thus the overall structure is highly durable and trouble free.

Having specifically described the preferred structures and use of the invention, it should be understood that some changes in the specific structures described and shown in my drawings may clearly be made without departing from the true scope of the invention in accordance with the appended claims.

What I claim as my invention is:

1. A rotatable crankshaft affixed transversely beneath a plurality of endless loop spaced-apart parallel conveyor belts on a tomato harvester; means affixed to said crankshaft for applying rotary power to axially rotate said crankshaft; said crankshaft including a plurality of offset placed crank journals equal in number to the conveyor belts, with a crank journal located under each of the conveyor belts;

a plurality of elongated tubular bearing sleeves, one of the bearing sleeves affixed over each of the crank journals, the bearing sleeve covered crank journals positioned relative to the conveyor belts so that with rotation of said crankshaft the sleeves are raised individually to impact the respective conveyor belts and impart temporary upward movement in the conveyor belts and thus vibration capable of dislodging tomatoes from vines when riding atop of the conveyor belts, the bearing sleeves covering each crank journal sized with an internal diameter substantially larger than an external diameter of the crank journal to allow both eccentric movement and rotation of the sleeves about the journals, each of the bearing sleeves split lengthwise into two sections connected together by interlocking tongue and groove snap lock means on opposing edges for affixing the two sections of the sleeves together about the crank journals, journal end plates affixed on said crankshaft at two oppositely disposed ends of each crank journal adjacent terminal ends of each sleeve for laterally retaining the sleeves positioned over the crank journals; each of the bearing sleeves being slightly shorter in length relative to the journal length and spacing between journal end plates so that each bearing sleeve is free to rotate about the journal.

2. A rotatable crankshaft according to claim 1 wherein said means affixed to said crankshaft for applying rotary power is a variable speed motor with speed controls for allowing adjustability in rotational speed of said crankshaft.

3. A rotatable crankshaft affixed transversely under a plurality of endless loop spaced-apart parallel conveyor belts on a tomato harvester; means affixed to said crankshaft for applying rotary power to axially rotate the crankshaft; said crankshaft including a plurality of offset placed journals with one journal located under each of the conveyor belts;

a plurality of elongated tubular bearing sleeves, one of the bearing sleeves affixed over each of the journals;

the bearing sleeve covered journals positioned relative to the conveyor belts so that with rotation of said crankshaft the sleeves are raised individually to impact the respective conveyor belts and impart upward movement in the conveyor belts and thus vibration capable of dislodging tomatoes from vines riding atop of the conveyor belts, each of the bearing sleeves split lengthwise into two sections and including interlocked snap lock means on opposing edges affixing the two sections of the sleeves together about the journals, each of the bearing sleeves sized relative to the journals for allowing the bearing sleeves to freely rotate and eccentrically move about the journals, means for laterally retaining the sleeves rotatably positioned over the journals.

\* \* \* \* \*